US009411389B2

(12) United States Patent
Shi et al.

(10) Patent No.: US 9,411,389 B2
(45) Date of Patent: Aug. 9, 2016

(54) DISTRIBUTED GENERATION CONTROL FOR MICROGRID DURING ISLANDING

(71) Applicants: Di Shi, San Jose, CA (US); Ratnesh Kumar Sharma, Fremont, CA (US); Yanzhu Ye, San Jose, CA (US)

(72) Inventors: Di Shi, San Jose, CA (US); Ratnesh Kumar Sharma, Fremont, CA (US); Yanzhu Ye, San Jose, CA (US)

(73) Assignee: NEC Corporation (JP)

(*) Notice: Subject to any disclaimer, the term of this patent is extended or adjusted under 35 U.S.C. 154(b) by 477 days.

(21) Appl. No.: 14/043,894

(22) Filed: Oct. 2, 2013

(65) Prior Publication Data
US 2014/0100705 A1 Apr. 10, 2014

Related U.S. Application Data

(60) Provisional application No. 61/711,399, filed on Oct. 9, 2012.

(51) Int. Cl.
G05D 11/00 (2006.01)
G06F 1/30 (2006.01)
H02J 3/38 (2006.01)
H02J 3/46 (2006.01)

(52) U.S. Cl.
CPC ............... G06F 1/305 (2013.01); H02J 3/381 (2013.01); H02J 3/383 (2013.01); H02J 3/46 (2013.01); H02J 2003/388 (2013.01); Y02E 10/563 (2013.01)

(58) Field of Classification Search
CPC ..... G06F 1/305; H02J 2003/388; H02J 3/381; H02J 3/383; H02J 3/46; Y02E 10/563
USPC ......................................................... 700/293
See application file for complete search history.

(56) References Cited

U.S. PATENT DOCUMENTS 5,006,846 A * 4/1991 Granville ............. G01R 15/183
324/126
5,798,633 A * 8/1998 Larsen ..................... H02J 3/28
307/87

(Continued)

OTHER PUBLICATIONS

Rapenne et al. "Study and Implementation of "Droop Control" Methods for Interfacingvoltage Source Inverters to Minigrid", presented at: 23rd European Photovoltaic Solar Energy Conference, Valencia, Spain, Sep. 1 to 5, 2008.*

Primary Examiner — Mohammad Ali
Assistant Examiner — Yuhui R Pan
(74) Attorney, Agent, or Firm — Joseph Kolodka

(57) ABSTRACT

System and methods are disclosed to handle power imbalance in one or more distributed generation (DG) units: detecting islanding at time $t_1$; selecting Phasor Measurement Unit (PMU) measurements during a pre-defined time window $[t_1-\tau, t_1]$; checking the time window for an abrupt voltage change; if no sudden change of voltage is detected, determining an average value of $s_{PMU}^t$ between $t_1$-$\tau$ and $t_1$ and using the average as a best estimate of a system power imbalance; if a sudden change of voltage is detected at time instant $t_2$, determining the average value of $s_{PMU}^t$ between $t_1$-$\tau$ and $t_2$ and using the average as a best estimate of the system power imbalance; and adjusting a power reference of the DG units based on the best estimated system power imbalance.

19 Claims, 4 Drawing Sheets

(56) References Cited

U.S. PATENT DOCUMENTS

| | | | | |
|---|---|---|---|---|
| 8,949,677 B1* | 2/2015 | Brundage | G06F 11/0745 | 714/48 |
| 2011/0068631 A1* | 3/2011 | Roscoe | H02J 3/38 | 307/69 |
| 2011/0251732 A1* | 10/2011 | Schweitzer, III | H02J 3/12 | 700/297 |
| 2011/0292701 A1* | 12/2011 | Fornage | G05F 1/67 | 363/95 |
| 2011/0316480 A1* | 12/2011 | Mills-Price | H02J 3/1821 | 320/109 |
| 2012/0283888 A1* | 11/2012 | Mao | H02J 3/14 | 700/291 |
| 2013/0345999 A1* | 12/2013 | Hafen | G01R 21/133 | 702/60 |

* cited by examiner

DISTRIBUTED GENERATION CONTROL FOR MICROGRID DURING ISLANDING

This application claims priority to Provisional Application Ser. No. 61/711,399 filed Oct. 9, 2012 the content of which is incorporated by reference.

BACKGROUND

This application relates to distributed generation control for microgrids.

The increasing penetration of distributed energy sources (DER) brings about the concept of microgrid (MG), in which distributed generation (DG) units and load are integrated in a low voltage (LV) network to enhance the reliability of the electric power systems. Integration of individual DGs not only benefits utilities and customers economically but also guarantees the continuity of the electricity supply under emergency conditions. Various types of DGs exist in a MG, including micro-turbine, photovoltaic (PV) system, fuel cell, battery storage, etc. These DGs are interfaced to the MG either through power electronic converters or through ac rotating machines. Compared to conventional rotating machines, DGs has the advantages of faster control capabilities with higher degree of flexibility. However, control of DGs remains a challenging area to explore, since they may bring as many problems as they may solve.

An MG should work under the grid-tied mode and the islanded mode. Under normal operating conditions, a MG is connected to a medium voltage network, either absorbing power from or injecting power into the main grid. Under the emergency mode, the MG is disconnected from the main grid and works autonomously, in a similar way to physical islands. The smooth transition between these two modes is of vital importance to realize the claimed benefits of MG.

SUMMARY

System and methods are disclosed to handle power imbalance in one or more distributed generation (DG) units: detecting islanding at time $t_1$; selecting Phasor Measurement Unit (PMU) measurements during a pre-defined time window $[t_1-\tau, t_1]$; checking the time window for an abrupt voltage change; if no sudden change of voltage is detected, determining an average value of $s_{PMU}^t$ between $t_1-\tau$ and $t_1$ and using the average as a best estimate of a system power imbalance; if a sudden change of voltage is detected at time instant $t_2$, determining the average value of $s_{PMU}^t$ between $t_1-\tau$ and $t_2$ and using the average as a best estimate of the system power imbalance; and adjusting a power reference of the DG units based on the best estimated system power imbalance.

Advantages of the preferred embodiments may include one or more of the following. The control strategy minimizes transients during the islanding process, and therefore, ensures the angle and voltage stability of the MG during and subsequent to the islanding process. The MG can operate under both grid-tied mode and islanded mode with a smooth transition between these two modes for high MG reliability. The system addresses DG controls for the smooth islanding of MG with a capability to minimize the transients and maintain MG stability. The system knows when to initialize and how to quantify the claimed controls to achieve the desired performance. The innovative DG control scheme, applied together with DG droop controls, minimizes system transients in the islanding process and ensures MG voltage and angle stability.

DETAILED DESCRIPTION

An innovative DG control scheme for MG islanding is discussed below. The control scheme, applied together with DG droop controls, minimizes system transients in the islanding process and ensures MG voltage and angle stability.

Figure 1:
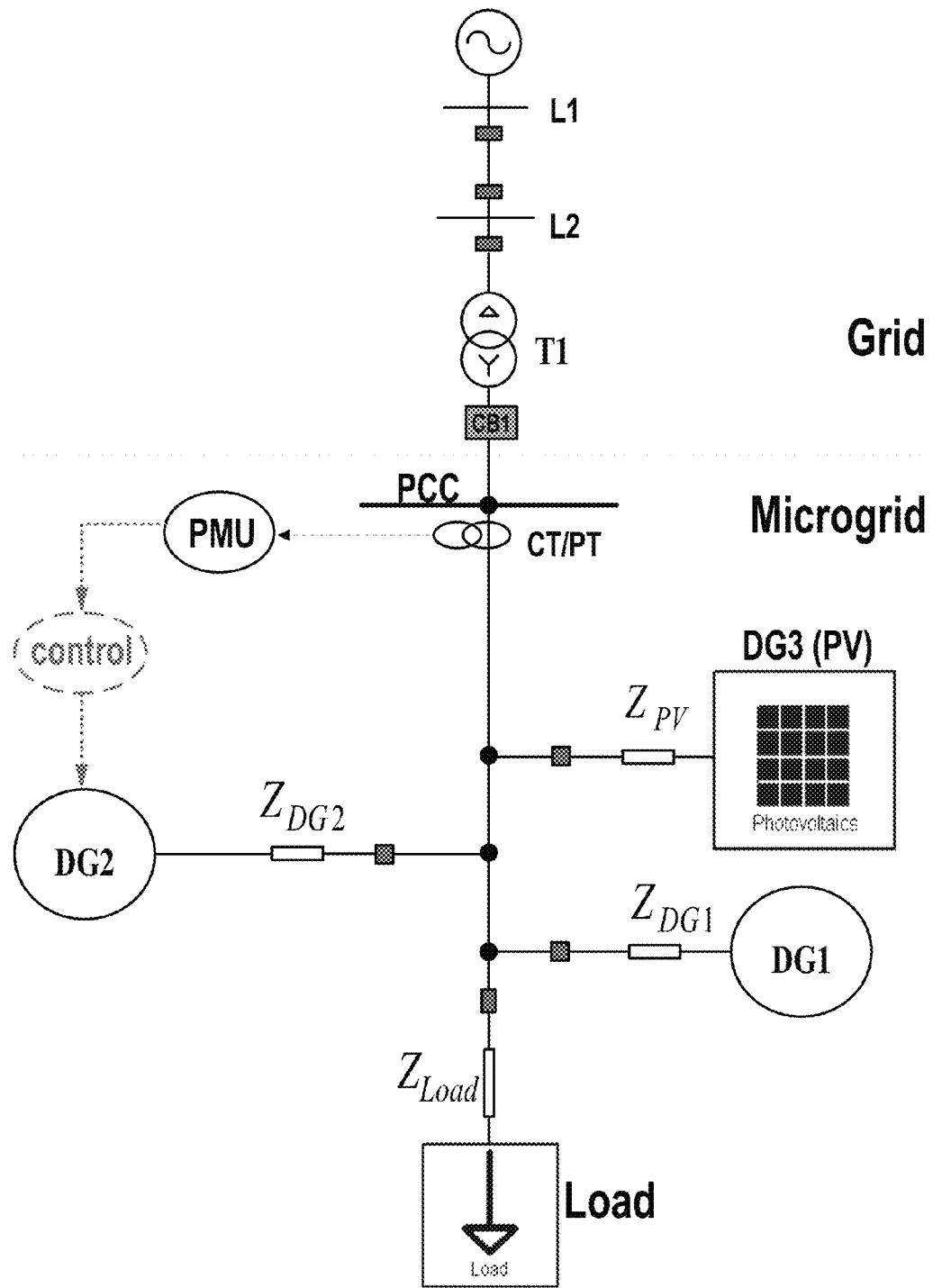
FIG. 1 shows a one-line diagram of an exemplary MG system.
Figure 2:
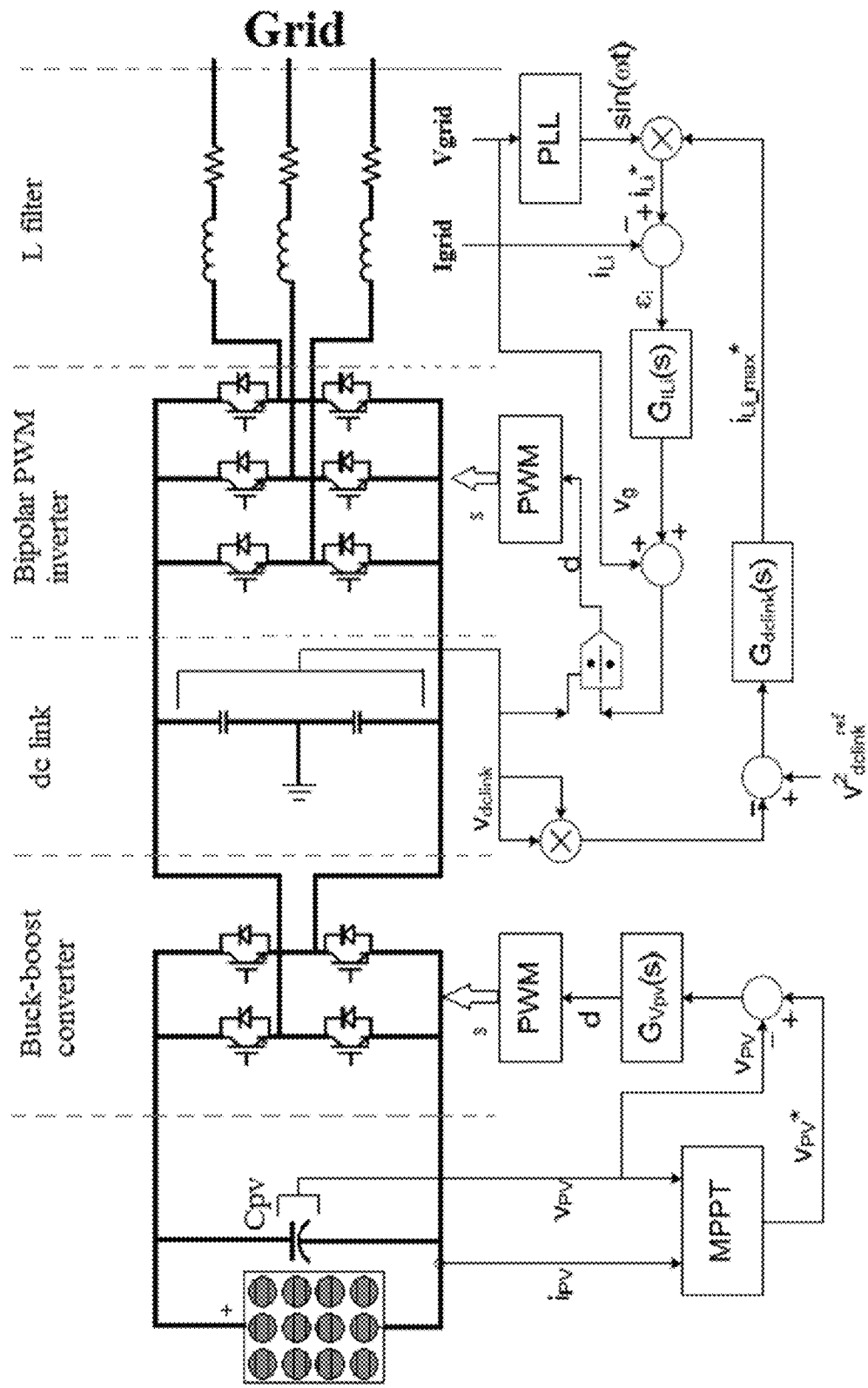
FIG. 2 shows an exemplary control diagram of a PV system.

A model of an exemplary three-phase, single-feeder microgrid with an one-line diagram is depicted in FIG. 1 the main grid is represented by a synchronous generator with transmission line L1-L2 and transformer T1. The MG is connected to the main grid at point of common coupling (PCC) via circuit breaker CB1. MG islanding can be achieved by opening CB1. Three DGs of different types are modeled: DG1-DG3. DG1 is modeled as a single-mass synchronous generator equipped with excitation and governor control. In practice, it represents either a diesel generator or a gas-turbine-generator unit. DG2 is a dispatchable power source interfaced to the feeder through a voltage-sourced converter. DG2 use decoupled d-q control and its active and reactive power outputs can be controlled independently. In real world, DG2 may also represent an energy storage unit (i.e., battery, capacitor, fly-wheel system) interfaced at the converter dc bus.

DG3 is a PV system, whose topology and control diagram have multiple PV panels, a buck-boost converter, a dc-link capacitor, and a three-phase bipolar PWM inverter. Various controls are implemented in the PV system, including the maximum power point tracking (MPPT), phase lock loop (PLL), inner-loop dc-link voltage regulator and outer-loop output current controller.

A PMU is simulated at the main feeder to measure both the voltage at PCC and the current flowing into MG. The real-time voltage and current waveforms from potential transformer PT and current transformer CT are transformed using Discrete Fourier Transform (DFT) to obtain the corresponding phasors. Loads are modeled in aggregated form as static passive components as functions of voltage and frequency. Real and reactive parts of the load are defined as (1)-(2).

$$P = P_o \cdot \left(\frac{V}{V_o}\right)^{NP} (1 + K_{PF} \cdot \Delta_f) \quad (1)$$

$$Q = Q_o \cdot \left(\frac{V}{V_o}\right)^{NQ} (1 + K_{QF} \cdot \Delta_f) \quad (2)$$

where $P_o$, $Q_o$, $V_o$ are the rated real power, reactive power, and voltage, respectively; P, Q, and V are the actual real/reactive power and voltage of the load; NP and NQ are voltage indexes for real and reactive power; $K_{PF}$ and $K_{QF}$ are frequency indexes of the real and reactive power.

DGs and load in the system are connected to the main distribution feeder through impedance $Z_{DG1}$, $Z_{DG2}$, $Z_{PV}$, and $Z_{Load}$, respectively.

Under grid-tied mode, the power ($s_{PMU}^t$) flowing from the main grid into the MG at any time instant t can be calculated using (3):

$$s_{PMU}^t = 3 v_{PCC}^t i_{PCC}^t \angle(\sigma_V - \sigma_I) \quad (3)$$

where $v_{PCC}{}^t\angle\sigma_V$ and $i_{PCC}{}^t\angle\sigma_I$ are positive sequence voltage and current phasors measured by PMU. The following power balance equation (4) can be used:

$$s_{PMU}^t + \sum_{i=1}^{N} s_{DG_i}^t - \sum_{j=1}^{M} s_{Load_j}^t - S_{loss} = 0 \quad (4)$$

where $s_{DG_i}{}^t$ is generation of the ith DG; $s_{Load_j}{}^t$ is the jth load; $S_{loss}$ is MG system loss; N and M are numbers of DGs and loads in MG.

When MG is disconnected from the main grid, power injection from the grid $s_{PMU}{}^t$ is cut off. The MG will go through a sophisticated transient process due to the pre-islanding disturbance, fault and generation-load imbalance. During islanding, voltages and system frequency deviate from the nominal values. Upon detection of such changes, each DGs in the MG will adjust its outputs accordingly based on the pre-defined control schemes to balance the load and to stabilize the system. The most commonly used control scheme is the droop control, the basic idea of which is to adjust DG output based on (5)-(6):

$$P_{DG_i} = P_{DG_i}^{ref} - K_f \cdot \Delta f \quad (5)$$

$$Q_{DG_i} = Q_{DG_i}^{ref} - K_V \cdot \Delta V \quad (6)$$

where $P_{DG_i}^{ref}$ and $Q_{DG_i}^{ref}$ redefined real and reactive power settings; $K_f$ is the frequency index for real power output while $K_V$ is the voltage index for reactive power output; $\Delta f$ and $\Delta V$ are frequency and voltage deviations from the nominal operating condition.

However, droop control has its limitation when used for MG islanding:

Droop control is sort of deviating regulation. The resulted voltage and frequency errors may not be acceptable based on existing standards.

Droop control is slow. DGs under droop control only reacts after voltage/frequency error is detected, when the best action time for system stability may have already passed.

Since electronically interfaced DGs can adjust their outputs in higher speed and degree of flexibility than the conventional rotating machines, the idea proposed here is to adaptively adjust the output power references of the DGs, immediately after the detection of islanding.

The MG system imbalance can be defined as the total power generation subtracted by total load and system loss. Islanding of MG can be either due to disturbances, such as a fault and its subsequent switching incidents, or due to pre-planned switching events. For preplanned islanding, MG power imbalance can be estimated with PMU measurements collected right before the CB opens. For islanding caused by disturbance or fault, it is challenging to estimate the true system power imbalance since the system operating condition may have already deteriorated before the CB opens. Consequently, behaviors of voltage and current measurements at the PCC have to be studied carefully for the best estimation of power imbalance within the MG.

One embodiment uses the following process to estimate the power imbalance for both aforementioned cases.

Assuming islanding is detected at time instant $t_1$, collect voltage and current phasors at PCC during predefined time window $[t_1-\tau, t_1]$.

Process the voltage phasors from time instant $t_1$ to $t_1-\tau$ (backward), and search for abrupt voltage change by evaluating its rate of change: difference the time series and compare the difference with the defined threshold $\epsilon$, as shown in (7):

$$\Delta v_{PCC} = |v_{PCC}^n - v_{PCC}^{n-1}| > \epsilon \quad (7)$$

If no abrupt change of voltage is detected, calculate the average value of $s_{PMU}{}^t$ within the specified time window $[t_1-\tau, t_1]$ using (3). Use this average as the best estimate of the MG power imbalance $S_I$ before islanding.

If abrupt change of voltage is detected at time instant $t_2$, calculate the average of $s_{PMU}{}^t$ in time window $[t_1-\tau, t_2]$ using (3). Use this average as the best estimate of the MG system power imbalance $S_I$.

The controller will send signals to electronically interfaced DGs adjusting their power reference based on the estimated system imbalance $S_I$, using (8)

$$\Delta S_{DG_i} = \Delta P_{DG_i} + j \cdot \Delta Q_{DG_i} = c_i \cdot S_I \quad (8)$$

$$\text{s.t.} \sum_{i=1}^{K} c_i = 1$$

where $\Delta S_{DG_i}$ is adjustment to the power reference of the ith DG; K is the total number of electronically interfaced DGs in MG; $c_i$ is the coefficient that determines the percentage of the total system imbalance assigned to the ith DG.

The length of the time window ($\tau$) is critical for the estimation of MG power imbalance. It has been noticed that, if $\tau$ is too small, $t_2$ could be very close to time instant $(t_1-\tau)$. For extreme condition, $t_2$ could even be right before $(t_1-\tau)$. Under these conditions, the calculated value of $S_{PMU}$ will be far away from the power imbalance, and certainly should not be used as the estimated MG system power imbalance. The selection of $\tau$ can be based on the islanding detection time. More specifically, the time window length be 2~3 times the largest possible islanding detection time.

Two case studies have been conducted to verify the proposed control. It is recognized that severity of the transients experienced by the MG during and subsequent to islanding process is highly dependent on several factors, including pre-islanding system operating conditions, DG types in the MG, islanding detection time, type and location of the event triggering islanding. This paper makes no attempt to validate the proposed scheme exhaustively under all circumstances but rather demonstrate its concept and principle. Towards that end, the following assumptions are used for the two exemplary case studies:

Major portion of the load (80~90%) in MG is supplied by local DGs while the rest is supplied by the utility (main) grid.

Output limits of DG2 are neglected, that is, DG2 can output whatever amount of power the controller requires.

Islanding is detected within 2 to 5 cycles depending on the severity of the event that initiates the process.

Figure 3:
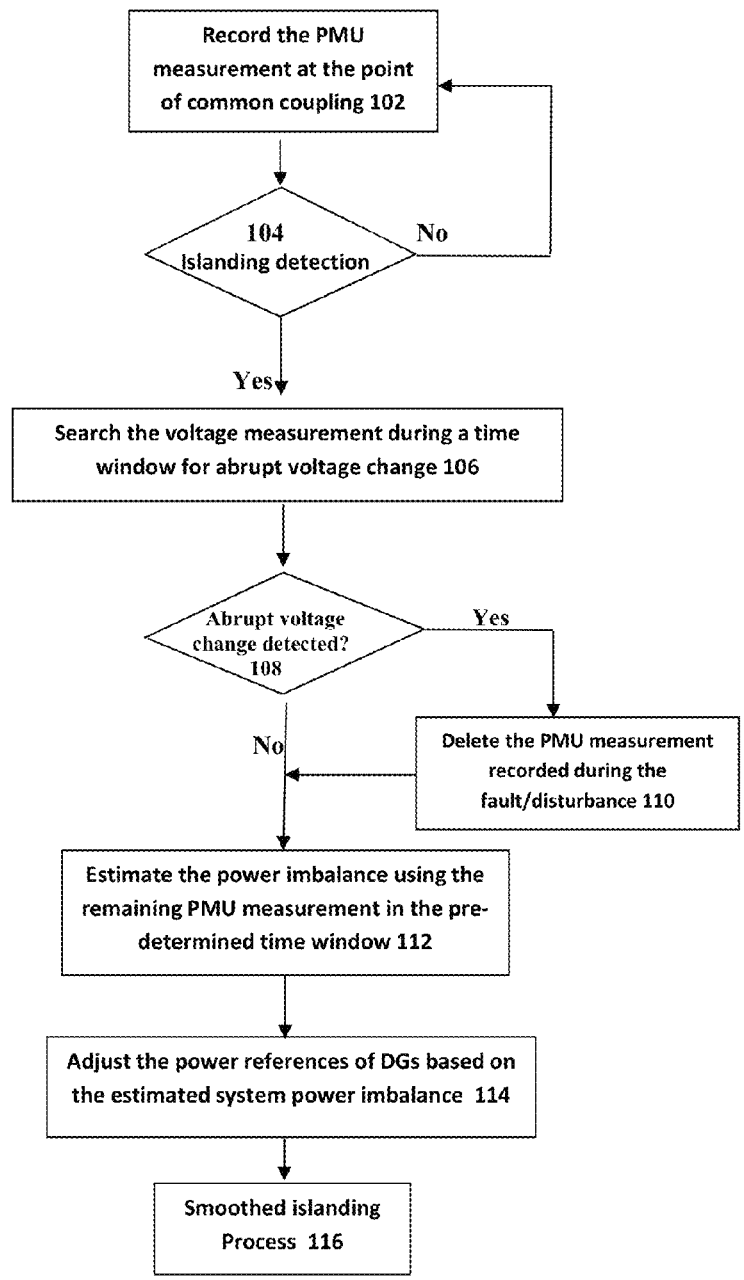
FIG. 3 shows an exemplary process for a Phasor Measurement Unit (PMU) based distributed generation control for a microgrid during an islanding process.

FIG. 3 shows an exemplary process for a Phasor Measurement Unit (PMU) based distributed generation control for a microgrid during an islanding process. First, the process records the PMU measurement at the point of common coupling (102). The process then determines islanding (104). If not, the process loops back to 102 and otherwise the process searches the voltage measurement during a time window for an abrupt voltage change (106). The process then changes for an abrupt voltage change (108). If so, the PMU measurement recorded during the disturbance is deleted (110). From 108 or 110, the process estimates a power imbalance using the remaining PMU measurement in the pre-determined time window (112). The process adjusts the power references of DGs based on the estimated system power imbalance (114). The process then performs smoothed islanding process (116).

Figure 4:
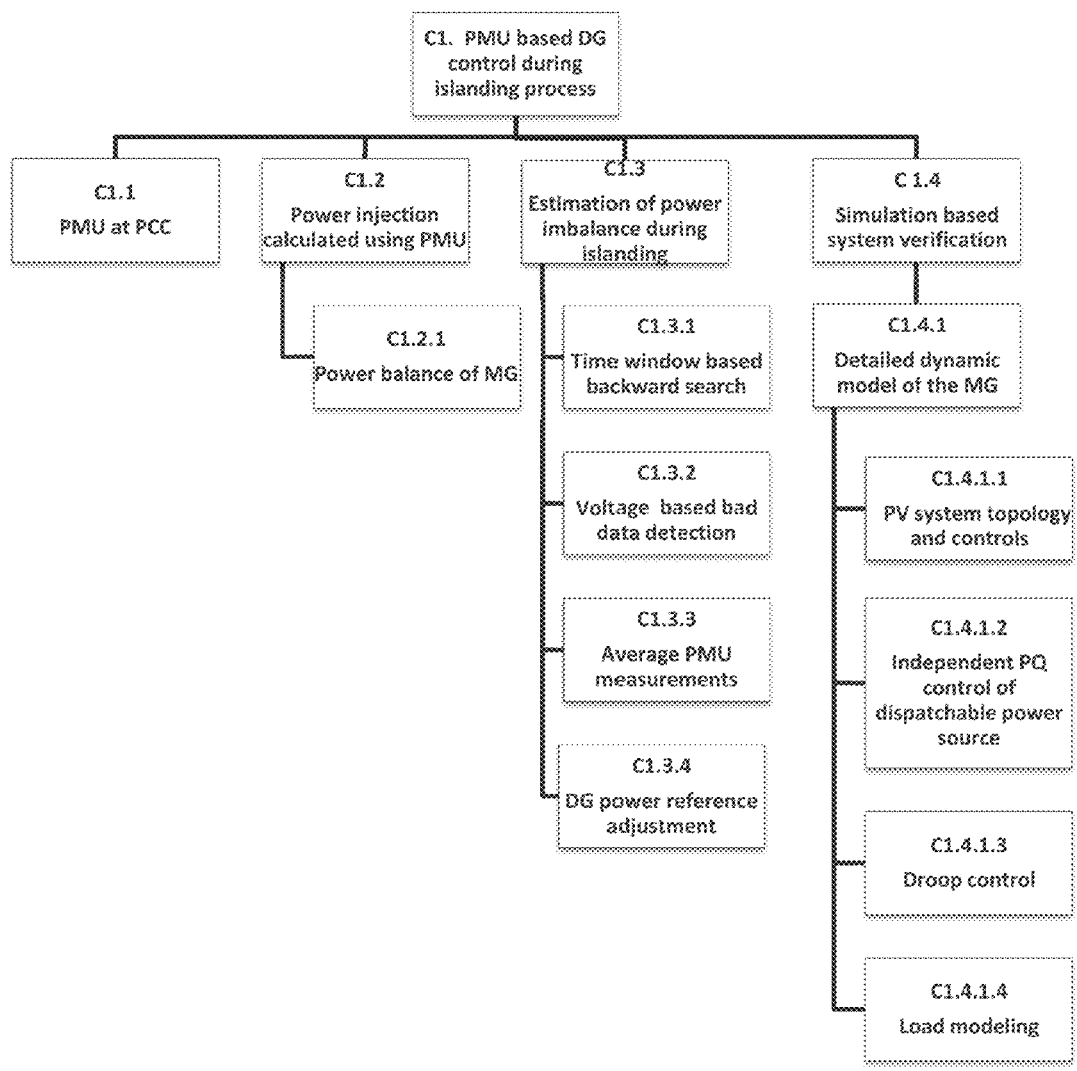
FIG. 4 shows another exemplary process for PMU based distributed generation control for a microgrid during the islanding process.

FIG. 4 shows another exemplary process for PMU based distributed generation control for the microgrid during the islanding process C.1 for PMU based DG control during islanding process which uses the PMU for the microgrid islanding control. The process C.1 runs the following modules:

C1.1 PMU at PCC

To implement the proposed control scheme, a PMU needs to be installed at the point of common coupling to measure both the voltages at PCC and the currents flowing from the main grid into the MG.

C1.2 Power Injection from Main Grid to MG

Under grid-tied operating conditions, the complex power $s_{PMU}^t$ flowing from the main grid into the MG at any time instant can be calculated based on the PMU measurements using (3):

$$s_{PMU}^t = 3 v_{PCC}^t i_{PCC}^{t*} \angle (\sigma_V - \sigma_I)$$

where $v_{PCC}^t \angle \sigma_V$ and $i_{PCC}^t \angle \sigma_I$ are the positive sequence voltage and current phasors measured by the PMU.

C1.2.1. Power Balance of MG

Under grid-tied operating conditions, the complex power $s_{PMU}^t$ from the main grid in addition to the total DG generation is always equal to the total load and system loss:

$$s_{PMU}^t + \sum_{i=1}^{N} s_{DG_i}^t - \sum_{j=1}^{M} s_{Load_j}^t - S_{loss} = 0$$

where $s_{DG_i}^t$ is the generation of the i th DG; $s_{Load_j}^t$ is the j th load; $S_{loss}$ is the loss within the MG; N and M are the total number of DGs and loads in the MG.

C1.3 Estimation of Power Imbalance During Islanding

When islanding occurs, the power within the MG no longer exists since the grid power injection $s_{PMU}^t$ disappears abruptly. The MG system will go through a sophisticated transient process, during which the DG outputs and load will be adjusted based on their settings, power ratings, and system droop characteristics. Estimating and compensating the power imbalance can make the islanding process smooth and increase the stability of the system.

C1.3.1 Time Window Based Backward Search

In order to estimate the power imbalance, the bad PMU data need to be removed. For bad data detection, time window based backward search is proposed. Assuming islanding is detected at time $t_1$, consider only the PMU measurements during a pre-defined time window $[t_1-\tau, t_1]$. Check the voltage measurements from time instant $t_1$ to $t_1-\tau$ (backward), and try to search for abnormal voltage change.

C1.3.2 Voltage Based Bad Data Detection

The abrupt change of voltage at PCC is used as a measure to detect the bad data in the PMU measurements. If sudden change of voltage is detected at time instant $t_2$, the PMU data between $t_1$ and $t_2$ are identified as bad data and only the rest of the PMU data are used to estimate the MG system power imbalance.

C1.3.3 Average PMU Measurements

After deleting the bad data, rest of the data in the searched time window is used to calculate the average power flow from the main grid to the MG. This average value is used as the best estimate of the MG system imbalance.

C1.3.4 DG Power Reference Adjustment

After computation of the estimated system imbalance $\overline{S}_{PMU}$, the power reference of electronically DGs can be adjusted based on:

$$\Delta S_{DG_i} = \Delta P_{DG_i} + j \cdot \Delta Q_{DG_i} = c_i \cdot \overline{S}_{PMU}$$

$$\text{s.t.} \sum_{i=1}^{K} c_i = 1$$

where $\Delta S_{DG_i}$ is the suggested adjustment to the power reference of the i th DG; K is the total number of electronically interfaced DG in the system; $c_i$ is a coefficient that determines what percentage of the total system imbalance should be assigned to the i th DG.

C1.4 Simulation Based System Verification

A practical MG system is selected and simulated to verify the proposed control scheme. The microgrid under study consists of three DG units: DG1, DG2 and the PV system. The main grid is simulated by a generator with a transmission line and distribution transformer. By opening circuit breaker at PCC, the microgrid can be disconnected from the main grid.

C1.4.1 Detailed Dynamic Model of the DG

To simulate the transients during the islanding process, detail dynamic models of the DGs and load are constructed with various controls. The control parameters are tuned in such a way that the system has best dynamic characteristics.

C1.4.1.1 PV System Topology and Controls

The PV system modeled includes multiple PV panels, a dc-dc buck-boost converter, a bipolar PWM inverter, and an L filter. Various controls are implemented in the PV modeling, including the maximum power point controller (MPPT), phase lock loop (PLL), inner-loop dc link voltage controller and outer-loop output current controller. The output current of the inverter is synchronized with the grid voltage so that the PV system is operating at unity power factor.

C1.4.1.2 Independent PQ Control of the Dispatchable Source

A dispatchable power source is modeled. It is interfaced to the MG through a voltage-sourced converter (VSC). The active and reactive power outputs of this dispatchable source are controlled independently.

C1.4.1.3 Droop Control

The real power vs. frequency and reactive power vs. voltage droop controls are used for the control of the DGs. The DG output varies with the system frequency and voltage levels following:

$$P_{DG_i} = P_{DG_i}^{ref} - K_f \cdot \Delta f$$

$$Q_{DG_i} = Q_{DG_i}^{ref} - K_V \cdot \Delta V$$

C1.4.1.4 Load Modeling

Load is modeled in aggregated form in the system as a static passive component which is a function of the voltage and frequency of the system. The real and reactive power of the load are considered separately using:

$$P = P_o \cdot \left(\frac{V}{V_o}\right)^{NP} (1 + K_{PF} \cdot \Delta_f)$$

-continued $$Q = Q_o \cdot \left(\frac{V}{V_o}\right)^{NQ}(1 + K_{QF} \cdot \Delta_f)$$

where $P_o$, $Q_o$, $V_o$ are the rated real power, reactive power, and voltage of the load; P, Q, and V are the actual real/reactive power and voltage of the load; $N_P$ and $N_Q$ are the voltage index for real and reactive power; $K_{PF}$ and $K_{QF}$ are the frequency index of the real and reactive power.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A process to handle power imbalance in one or more distributed generation (DG) units in a microgrid (MG) to supply a main grid, comprising:
    electronically interfacing the DG units to a processor wherein active and reactive power outputs of the DG are controlled independently by the processor;
    detecting islanding at time $t_1$;
    selecting Phasor Measurement Unit (PMU) measurements during a pre-defined time window $[t_1-\tau, t_1]$;
    checking the time window for an abrupt voltage change;
    if no sudden change of voltage is detected, determining an average value of a complex power flowing into the microgrid at time instant t measured by the PMU ($s_{PMU}^t$) between $t_1-\tau$ and $t_1$ and using the average as a best estimate of a system power imbalance;
    if a sudden change of voltage is detected at time instant $t_2$, determining the average value of the $s_{PMU}^t$ between $t_1-\tau$ and $t_2$ and using the average as a best estimate of the system power imbalance; and
    adjusting by the processor a real and reactive power reference of the DG units based on the best estimated system power imbalance and a percentage of a total system imbalance assigned to each DG.

2. The process of claim 1, wherein the PMU is installed at a point of common coupling (PCC) to measure voltages at PCC and the currents flowing from the main grid into the MG.

3. The process of claim 1, wherein a complex power $s_{PMU}^t$ flowing from the main grid into the MG at any time instant is determined as:

$$s_{PMU}^t = 3v_{PCC}^t i_{PCC}^t \angle (\sigma_V - \sigma_I)$$

where $s_{PMU}^t$ is a complex power flowing into the microgrid at time instant t measured by the PMU; $v_{PCC}^t \angle \sigma_V$ is a positive-sequence voltage phasor measured at point of common coupling by the PMU at time instant t, and $v_{PCC}^t$ is a magnitude of a phasor while $\sigma_V$ is a phase angle of the phasor; $i_{PCC}^t \angle \sigma_I$ is a positive sequence current phasors measured at PCC by the PMU at time instant t, and $i_{PCC}^t$ is a magnitude of the phasor while is the phase angle of the phasor.

4. The process of claim 1, wherein complex power $s_{PMU}^t$ from the main grid in addition to the total DG generation is equal to a total load and system loss:

$$s_{PMU}^t + \sum_{i=1}^{N} s_{DG_i}^t - \sum_{j=1}^{M} s_{Load_j}^t - S_{loss} = 0$$

where $s_{PMU}^t$ is a complex power flowing into the microgrid at time instant t measured by the PMU; $s_{DG_i}^t$ is a complex power generation of the i th DG; $s_{Load_j}^t$ is a complex power of the j th load; $s_{loss}$ is a complex power loss within the MG; N and M are the total number of DGs and loads in the MG, respectively.

5. The process of claim 1, comprising estimating power imbalance during islanding.

6. The process of claim 5, wherein when islanding occurs, power within the MG is removed and the MG adjusts DG outputs and load based on settings, power ratings, and system droop characteristics to make islanding smooth and increase system stability.

7. The process of claim 1, comprising checking voltage measurements backward from time instant t1 to t1-$\tau$ and searching for abnormal voltage change.

8. The process of claim 1, comprising using an abrupt change of voltage at the PCC to detect bad data in PMU measurements.

9. The process of claim 1, comprising:
    detecting a sudden change of voltage at time instant t2 and identifying PMU data between t1 and t2 as bad data and using the rest of the PMU data to estimate an MG system power imbalance; and
    determining an average power flow from the main grid to the MG as the best estimate of an MG system imbalance.

10. The process of claim 9, wherein after determining the estimated system imbalance $\overline{S}_{PMU}$, adjusting the power reference of the DGs based on:

$$\Delta S_{DG_i} = \Delta P_{DG_i} + j \cdot \Delta Q_{DG_i} = c_i \cdot \overline{S}_{PMU}$$

$$\text{s.t.} \sum_{i=1}^{K} c_i = 1$$

where $\Delta S_{DG_i}$ is the suggested complex power adjustment to the power reference of the i th DG; $P_{DG_i}$ is the real power part of the complex power $\Delta S_{DG_i}$; $\Delta Q_{DG_i}$ is the reactive power part of the complex power $\Delta S_{DG_i}$; $S_{PMU}$ is the system complex power imbalance calculated based on PMU measurements; K is the total number of electronically interfaced DG; $c_i$ is a coefficient that determines the percentage of the total system imbalance that is assigned to the i th DG.

11. The process of claim 1, comprising performing simulation based system verification, wherein the main grid is simulated by a generator with a transmission line and distribution transformer, and wherein opening a circuit breaker at PCC disconnects the microgrid from the main grid.

12. The process of claim 11, comprising applying a dynamic model of the DG.

13. The process of claim 12, wherein the microgrid includes a photovoltaic (PV) system, comprising modeling the PV system with multiple PV panels, a dc-dc buck-boost converter, a bipolar pulse-width-modulation inverter, and a filter.

14. The process of claim 13, comprising modeling controls in the PV modeling, including maximum power point controller (MDPT), phase lock loop (PLL), inner-loop dc link voltage controller and outer-loop output current controller, wherein an output current of the inverter is synchronized with the grid voltage so that the PV system is operating at unity power factor.

15. The process of claim 1, comprising modeling a dispatchable power source interfaced to the MG through a voltage-sourced converter (VSC) and active and reactive power outputs of the dispatchable source are controlled independently.

16. The process of claim 1, wherein real power, frequency and reactive power, and voltage droop controls are used for the control of the DGs whose output varies with the system frequency and voltage levels:

$$P_{DG_i} = P_{DG_i}^{ref} - K_f \cdot \Delta f$$

$$Q_{DG_i} = Q_{DG_i}^{ref} - K_V \cdot \Delta V$$

where $P_{DGi}$ is the actual real power output of the i th DG; $P_{DGi}^{ref}$ is the real power reference/setting of the i th DG; $K_f$ is the droop coefficient for the real power; $\Delta f$ is the frequency deviation of the microgrid; $Q_{DGi}$ is the actual reactive power output of the i th DG; $Q_{DGi}^{ref}$ is the reactive power reference/setting of the i th DG; $K_V$ is the droop coefficient for the reactive power; $\Delta V$ is the voltage deviation of the microgrid at point of common coupling or the output terminal of each DG.

17. The process of claim 1, comprising performing load modeling, wherein a load is modeled in aggregated form as a static passive component and as a function of voltage and frequency of the system.

18. The process of claim 17, wherein real and reactive power of the load are processed separately using:

$$P = P_o \cdot \left(\frac{V}{V_o}\right)^{NP} (1 + K_{PF} \cdot \Delta_f)$$

$$Q = Q_o \cdot \left(\frac{V}{V_o}\right)^{NQ} (1 + K_{QF} \cdot \Delta_f)$$

where $P_o$, $Q_o$, $V_o$ are the rated real power, reactive power, and voltage of the load; P, Q, and V are the actual real/reactive power and voltage of the load; $N_P$ and $N_Q$ are the voltage index for real and reactive power; $K_{PF}$ and $K_{QF}$ are the frequency index of the real and reactive power and $\Delta f$ is the frequency deviation of the microgrid.

19. A process to handle power imbalance in one or more distributed generation (DG) units in a microgrid (MG) to supply a main grid, comprising:
  electronically interfacing the DG units to a processor, wherein active and reactive power outputs of the DG are controlled independently by the processor;
  detecting islanding at time instant $t_1$ and collecting voltage and current phasors at a point of common coupling (PCC) during a predefined time window $[t_1-\tau, t_1]$;
  processing voltage phasors backward in time from time instant $t_1$ to $t_1-\tau$;
  searching for an abrupt voltage change by evaluating its rate of change;
  if no abrupt change of voltage is detected, determining an average value of $s_{PMU}^t$ within the time window $[t_1-\tau, t_1]$ and using the average as the best estimate of an MG power imbalance $S_I$ before islanding;
  if the abrupt change of voltage is detected at time instant $t_2$, determining the average of $s_{PMU}^t$ in time window $[t_1-\tau, t_2]$ and using the average as the best estimate of the MG power imbalance $S_I$;
  adjusting the DG's real and reactive power reference based on the estimated MG power imbalance $S_I$ as:

$$\Delta S_{DG_i} = \Delta P_{DG_i} + j \cdot \Delta Q_{DG_i} = c_i \cdot S_I$$

$$\text{s.t.} \sum_{i=1}^{K} c_i = 1$$

where $\Delta s_{DG_i}$ adjustment to the power reference of the ith DG; K is the total number of electronically interfaced DGs in MG; $c_i$ is the coefficient that determines the percentage of the total system imbalance assigned to the ith DG where $s_{PMU}^t$ is a complex power flowing into the microgrid at time instant t measured by the PMU and where $P_{DGi}$ is the actual real power output of the i th DG; $Q_{DGi}$ is the actual reactive power output of the i th DG; and wherein the rate of change $\Delta C_{PCC}$ is determined by a difference in a time series and comparing the difference with a defined threshold $\epsilon$:

$$\Delta v_{PCC} = |v_{PCC}^n - v_{PCC}^{n-1}| > \epsilon.$$

* * * * *